(12) United States Patent
Milliken

(10) Patent No.: US 7,853,803 B2
(45) Date of Patent: Dec. 14, 2010

(54) SYSTEM AND METHOD FOR THWARTING BUFFER OVERFLOW ATTACKS USING ENCRYPTED PROCESS POINTERS

(75) Inventor: Walter Clark Milliken, Dover, NH (US)

(73) Assignees: Verizon Corporate Services Group Inc., Basking Ridge, NJ (US); Raytheon BBN Technologies Corp., Basking Ridge, NJ (US)

( * ) Notice: Subject to any disclaimer, the term of this patent is extended or adjusted under 35 U.S.C. 154(b) by 1319 days.

(21) Appl. No.: 10/229,712

(22) Filed: Aug. 28, 2002

(65) Prior Publication Data

US 2003/0065929 A1 Apr. 3, 2003

Related U.S. Application Data

(60) Provisional application No. 60/325,949, filed on Sep. 28, 2001.

(51) Int. Cl.
G06F 12/14 (2006.01)
G06F 11/30 (2006.01)
H04L 9/32 (2006.01)

(52) U.S. Cl. ............ 713/190; 713/176; 713/187; 726/23

(58) Field of Classification Search ........... 713/187, 713/190; 726/23
See application file for complete search history.

(56) References Cited

U.S. PATENT DOCUMENTS

| 4,168,396 | A | | 9/1979 | Best ........................ 178/22 |
| 4,278,837 | A | | 7/1981 | Best ........................ 178/22.09 |
| 4,465,901 | A | | 8/1984 | Best ........................ 178/22.08 |
| 4,525,599 | A | * | 6/1985 | Curran et al. ............ 713/190 |
| 4,558,176 | A | * | 12/1985 | Arnold et al. ............ 713/190 |
| 5,675,645 | A | * | 10/1997 | Schwartz et al. ........... 713/187 |
| 5,915,266 | A | * | 6/1999 | Falik et al. ............... 711/211 |
| 5,949,973 | A | * | 9/1999 | Yarom ................... 726/23 |
| 6,006,328 | A | * | 12/1999 | Drake ................... 726/23 |
| 6,044,157 | A | * | 3/2000 | Uesaka et al. ............ 380/201 |

(Continued)

OTHER PUBLICATIONS

Frantzen et al. "StackGhost; Hardware Facilitated Stack Protection", May 2001. Published in USENIX Security Symposium '01.*

(Continued)

Primary Examiner—Matthew T Henning

(57) ABSTRACT

A method (200) and program (100) for inhibiting attack upon a computer (120) is provided. The address (104) of a process (106) is produced (612), and encrypted (616) to produce an encrypted address (518), which is then stored in memory (128). When needed, the encrypted address (518) is retrieved (702) from memory (128) and decrypted (704) to reproduce the original process address (104). The reproduced process address (104) is then verified (708). If the process address (104) is determined (708) to be valid, i.e., there was no attack, then the process address (104) is placed (712) in the program counter (318), and a valid process (106) is executed. If the process address (104) is determined (708) to be invalid, i.e., there was an attack, then the address (108) of a crash and terminate process (110) is placed (716) in the program counter (318) and the computer (120) crashes. A nonce value (512) may be generated (602) and encrypted (616) and decrypted (704) in conjunction with the process address (104). The nonce value (512) may then be verified (710) independently, thereby increasing security.

44 Claims, 4 Drawing Sheets

U.S. PATENT DOCUMENTS

| | | | | |
|---|---|---|---|---|
| 6,202,176 | B1 * | 3/2001 | Baldischweiler et al. | 714/38 |
| 6,301,699 | B1 * | 10/2001 | Hollander et al. | 717/131 |
| 6,308,256 | B1 * | 10/2001 | Folmsbee | 712/209 |
| 6,412,071 | B1 * | 6/2002 | Hollander et al. | 726/23 |
| 6,519,702 | B1 * | 2/2003 | Williams | 726/23 |
| 6,578,094 | B1 * | 6/2003 | Moudgill | 710/57 |
| 6,832,302 | B1 * | 12/2004 | Fetzer et al. | 711/170 |
| 7,185,205 | B2 * | 2/2007 | Launchbury et al. | 713/189 |
| 2001/0013094 | A1 * | 8/2001 | Etoh et al. | 712/227 |
| 2003/0033542 | A1 * | 2/2003 | Goseva-Popstojanova et al. | 713/201 |
| 2003/0097581 | A1 * | 5/2003 | Zimmer | 713/200 |
| 2003/0182572 | A1 * | 9/2003 | Cowan et al. | 713/200 |
| 2003/0217277 | A1 * | 11/2003 | Narayanan | 713/187 |

OTHER PUBLICATIONS

Cowan et al. "Pointguard: Protecting Pointers from Buffer Overflow Vulnerabilities", Aug. 2003, In Proceedings of the 12th USENIX Security Symposium, pp. 91-104.*

Cowan et al. "Buffer Overflows: Attacks and Defenses for the Vulnerability of the Decade", Jan. 2000, In Proceedings DARPA Information Survivability Conference and Exposition, pp. 119-129.*

Schneier, Bruce "Applied Cryptography, Second Edition" 1996, John Wiley and Sons, pp. 10-11, 183-184, 223-225.*

Silberschatz et al. "Operating System Concepts" 1999, $5^{th}$ Edition, John Wiley and Sons, pp. 402-406.*

Daemen et al. "AES Proposal: Rijndael" Document Version 2, 1999, pp. 1-45.*

IEEE Standard Computer Dictionary, 1990, The Institute of Electrical and Electronics Engineers, pp. 45.*

Menezes et al., "Handbook of Applied Cryptography", 1997, CRC Press LLC, Section 1.8.*

The SPARC Architecture Manual, Version 9, 1994, PTR Prentice Hall, pp. 1-399.*

Vendicator, "Stack Shield: A 'stack smashing' technique protection tool for Linux," http://www.angelfire.com/sk/stackshield/, 5 pages, Aug. 1, 2000.

M. Kuhn, "The TrustNo 1 Cryptoprocessor Concept," Technial Report, Purdue University, pp. 1-6, Apr. 30, 1997.

Announcing the Advanced Encryption Standard (AES), Federal Information Processing Standards Publication 197, 51 Pages, Nov. 26, 2001.

A. Snarskii, "Increasing Overall Security," email posting to freebsd-hackers mailing list, http://docs.freebsd.org/mail/archive/1997/freebsd-hackers/19970209.freebsd-hackers.html, 5 pages, Feb. 9, 1997.

Computer Emergency Response Team, "CERT/CC Advisories 1998-2001," http://www.cert.org/advisories, 51 Pages, 1998-2001.

A. Baratloo et al., Libsafe: Protecting Critical Elements of Stacks, White Paper, 11 Pages, Dec. 25, 1999.

Bypassing Stackguard and Stackshield, Bulba and Kil3r lam3rz@hert.org, Phrack Magazine, vol. 0xa, Issue 0x38, 14 Pages, May 1, 2000.

Smashing the Stack for fun and Profit, aleph1@underground.org, Phrack 49, vol. 7, Issue 49, File 14 of 16, 34 pages. Nov. 8, 1996.

A. Baratloo et al.,Transparent Run-Time Defense Against Stack Smashing Attacks, USENIX Technical Program, USENIX Annual Conference, General Session, Jun. 2000, 19 Pages.

T. Tsai et al., Libsafe 2.0: Detection of Format String Vulnerability Exploits, White Paper, Feb. 6, 2001 (Version 3-21-01), 5 Pages.

DilDog@LOPHT.COM, The Tao of windows buffer Overflow, http://www.cultdeadcow.com/cDc_files/cDc-351/essence.html, Apr. 16, 1998, 20 Pages.

H. Etoh et al., Protecting from Stack-Smashing Attacks, http://www.trl.ibm.com/projects/security/ssp/main.html, Jun. 19, 2000, 17 Pages.

* cited by examiner

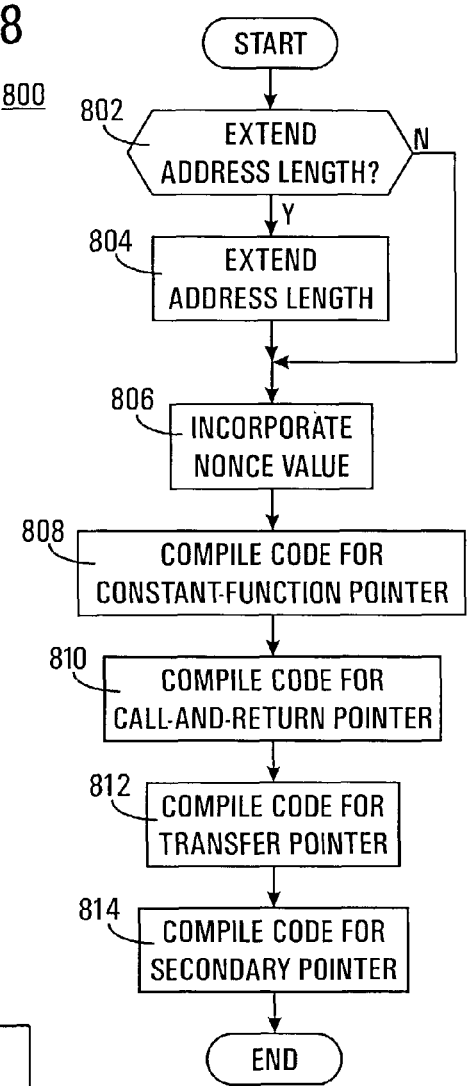
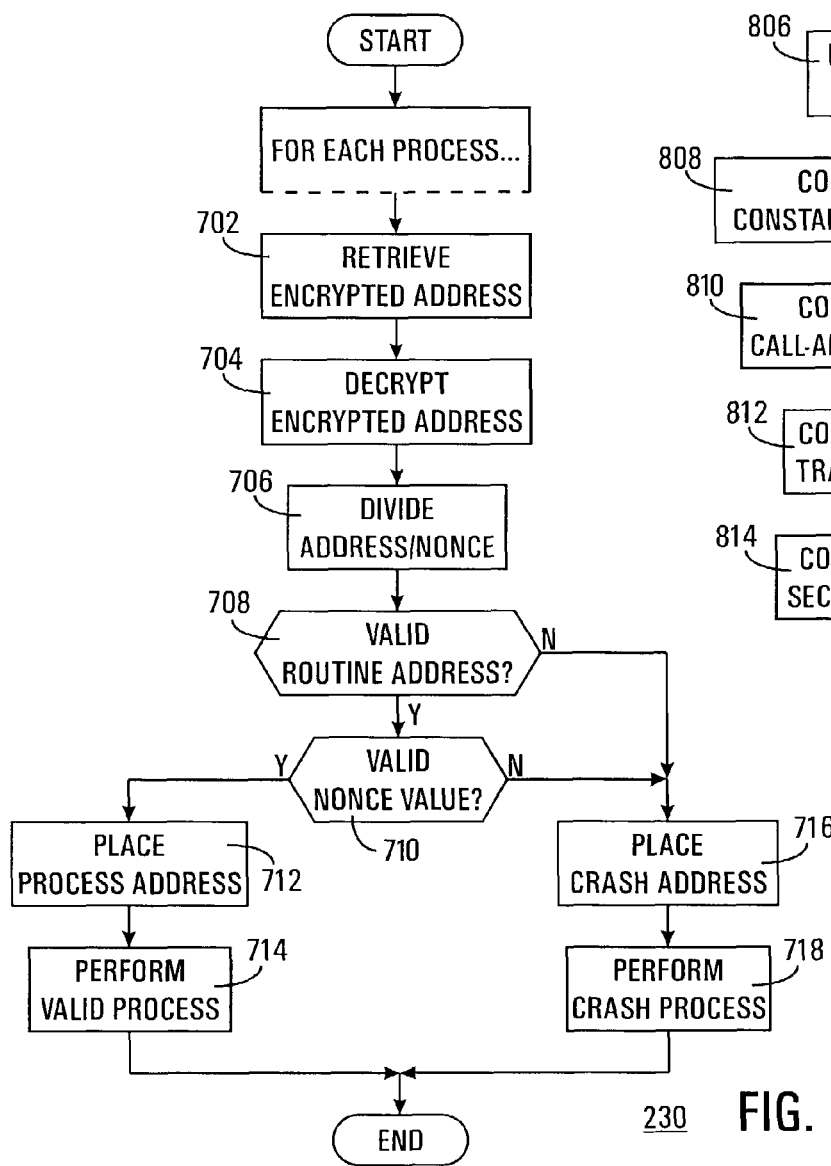

SYSTEM AND METHOD FOR THWARTING BUFFER OVERFLOW ATTACKS USING ENCRYPTED PROCESS POINTERS

RELATED INVENTION

The present invention claims benefit under 35 U.S.C. 119 (e) to "Encryption-PC," U.S. Provisional Patent Application Ser. No. 60/325,949, filed Sep. 28, 2001, which is incorporated by reference herein.

TECHNICAL FIELD OF THE INVENTION

The present invention relates to the field of protecting computers against computer attacks. More specifically, the present invention relates to the field of code modification to inhibit computer attacks.

BACKGROUND OF THE INVENTION

Networked computers are highly vulnerable to a class of attacks known as buffer overflow attacks. To exploit a buffer overflow, an attacker sends a message containing malicious code to a computer. This message is crafted to override an address pointer with the address of the interjected malicious code. In due course, the overwritten pointer is copied into the program counter of the computer's central processing unit (CPU). The CPU then executes the malicious code.

Buffer overflow attacks can create a back door for the attacker, transfer sensitive information from the system, destabilize the system, or open the system to use as a source node in a distributed denial of service attack. Buffer overflow attacks are common, easy to exploit, hard to eliminate, and potentially highly damaging when successful.

Common implementations of the memory subsystem of many operating systems (e.g., Unix, Linux, and Windows 9x/me/2000/NT/XP) are vulnerable to exploitation by network-based attackers. The memory subsystem of these operating systems fails to provide adequate facilities to ensure that unauthorized processes cannot access and alter memory.

One of the most common methods for attackers to gain unauthorized access to networked hosts is to introduce malicious code through externally accessible network services (e.g., through the Internet or an intranet). The attacker typically sends a message containing the malicious code to a server process. The message is crafted to overwrite a code pointer, causing the host CPU to jump to and execute the attacker's code. Since server processes typically operate with elevated privileges, the malicious code, when executed, usually has free rein on the compromised system to access information or create a back door for the attacker to access the machine at his convenience. Often, the malicious code will allow the use of the compromised system as a host for a secondary attack through the network. Many distributed denial-of-service attacks have been launched from large numbers of innocent machines that had been compromised in just such a way.

These buffer overflow attacks are too easy to launch. Of the Department of Defense Computer Emergency Response Team (CERT) advisories that describe attacks resulting in the attacker gaining elevated privileges on compromised systems, approximately 75% are buffer overflow attacks. Such attacks affect a wide range of server software running on an equally wide range of operating systems, both open source and commercial. It is not just server software that is vulnerable. Client software has also been successfully subverted in a similar manner by causing the processing of maliciously constructed web pages, mail messages, and/or data files.

Although developing code for a buffer overflow attack may require a certain amount of initial analysis and trial-and-error experimentation, once a suitable vulnerability has been uncovered in a piece of software, the means of exploiting it can easily be automated. Furthermore, the code developed is usually made freely available on the Internet. This makes the attack technique accessible to and usable by attackers with almost no technical sophistication.

Resistance to such attacks is desirable if an operating system is to be trusted. The traditional response to such an attack is reactive. That is, when vulnerability is discovered, the vulnerable software is patched to eliminate the vulnerability. This is an after-the-fact response, since vulnerabilities are often only discovered after a number of attacks have been detected. Also, this response is slow, as patches have an appreciable lead-time in their development and dissemination. Additionally, this post-attack patching approach offers no protection against vulnerable function calls that are not yet included.

Certain programming languages, most notably C and C++, are especially vulnerable to buffer overflow attacks. This is because these languages pass pointers and function return addresses over the stack. Unix and Unix-like operating systems are typically written in C. In these operating systems, fixed code resides in a "text" segment, fixed data resides in a "rodata" segment (which may be combined with the text segment), variable code and data reside in a "data" segment, and i/o buffers and the stack reside in a "bss" segment. The text and rodata segments are classed read-only. That is, the code and data contained in these segments generally cannot be altered from the outside. The data and bss segments, on the other hand, are classed as read/write. Code and data in these segments are therefore vulnerable to attack.

In a typical buffer overflow attack, the attacker introduces code into the memory space of the target system, then the attacker causes the CPU to execute the code. The most common means of accomplishing this is by subverting one of the many "daemon" processes present in modern operating systems. These are usually configured to both accept messages from the network, and operate at high levels of privilege. To illustrate a typical attack, consider a simplified example, where the daemon has a simple message-processing process that allocates one fixed-length buffer to store the incoming message. On entry, a stack frame contains a buffer/stack area in which the buffer grows upward and the stack grows downward, i.e., the buffer and stack grow towards each other.

Normally, a message is received and placed in the buffer. This message is then processed by a daemon whose return address is placed on the stack. In this case, when the daemon terminates, the return address is popped off the stack and loaded into the CPU program counter, and execution continues as normal.

Now suppose an attacker wishes to compromise the host on which the daemon is running. The attacker constructs a message longer than the reserved space in the buffer, containing some code, additional meaningless data to fill the remainder of the memory space, and a pointer to the code, designed to go exactly in the position of the return address.

The attacker has succeeded in "smashing the stack." Now, when the process terminates, instead of the correct return address being popped off the stack into the program counter, the program counter is filled with the address of the malicious code, which is duly executed, with the same execution privileges as the subverted daemon process. This code can be used to create a back door to allow the attacker to log in and perform other operations at his leisure.

Those skilled in the art will appreciate that there are many variations on this basic theme, not all of which involve overwriting the return address on the stack. Other code pointers may be overwritten, such as function pointers passed as parameters in C. These attacks have one thing in common, however. They all rely on replacing a valid code pointer with a pointer to the attacker's code. The subverted pointer is then loaded into the program counter in place of the legitimate pointer that it replaces, and the malicious code is executed.

Stack-protection approaches have met with limited success. These approaches attempt to prevent overwriting critical areas on the stack where code addresses might be found, or to detect such overwriting attempts. While effective on some buffer overflow attacks (until attackers find a work-around, which they have often done), simply protecting the stack is an incomplete solution at best.

Conventional approaches overlook the fundamental problem. An attacker can stage these attacks because the program counter can be made to point to arbitrary locations. The conventional approaches fail to protect the values loaded into the program counter.

SUMMARY OF THE INVENTION

Accordingly, it is an advantage of the present invention that a method and program for inhibiting attack upon a computer is provided.

It is another advantage of the present invention that process addresses are encrypted, stored, and decrypted prior to being placed in the program counter.

It is another advantage of the present invention that encryption and decryption of process addresses may be effected within a processor.

It is another advantage of the present invention that encryption and decryption of process addresses is effected through the use of a secure key.

It is another advantage of the present invention that encryption and decryption of process addresses may be effected in conjunction with a nonce value.

It is another advantage of the present invention that post-decryption verification of a process address is supported.

The above and other advantages of the present invention are carried out in one form by a method for inhibiting attack upon a computer. This method produces a process address to be used by a program counter of the computer, encrypts the process address to produce an encrypted address, stores the encrypted address in a memory of the computer, retrieves the encrypted address from the memory, and decrypts the encrypted address to reproduce the process address.

The above and other advantages of the present invention are carried out in another form by a computer program configured to operate upon a computer and to inhibit attack upon the computer, wherein the computer program resides upon a computer-readable medium, and wherein the computer program has a first code portion configured to encrypt a process address to produce an encrypted address, a second code portion configured to store the encrypted address in a memory of the computer, a third code portion configured to retrieve the encrypted address from said memory, a fourth code portion configured to decrypt the encrypted address to reproduce the process address, and a fifth code portion configured to place the process address in a program counter of the computer.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 shows a flowchart of an address-decryption sub-procedure of the procedure of FIG. 2 in accordance with a preferred embodiment of the present invention; and FIG. 8 shows a flowchart of a compilation procedure for creation of the attack-inhibiting procedure of FIG. 2 in accordance with a preferred embodiment of the present invention.

DETAILED DESCRIPTION OF THE-PREFERRED EMBODIMENTS

Figure 1:
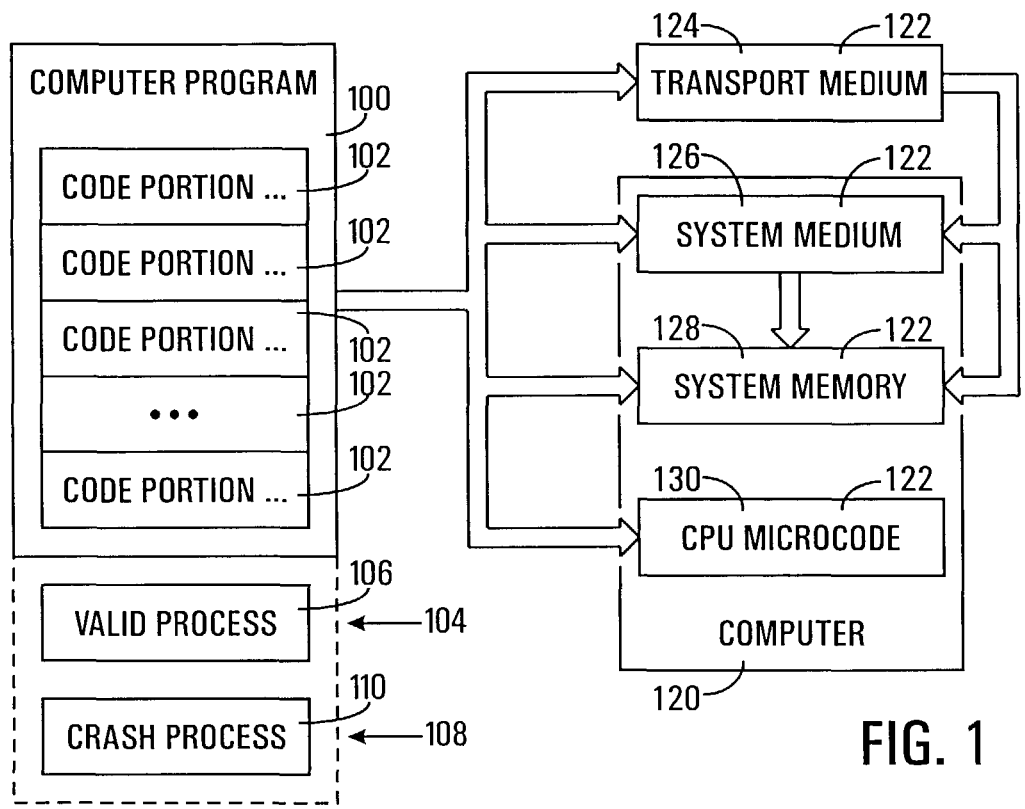
FIG. 1 shows a schematic view depicting the relationship between an attack-inhibiting computer program and a computer in accordance with preferred embodiments of the present invention.

Throughout this discussion, items are assigned three-digit reference numbers whose first digit reflects the Figure in which the item first appears. That is, items first appearing in FIG. 1 are assigned reference numbers between 100 and 199, etc. Once assigned, a given reference number is used in all Figures in which that item appears.

The present invention employs a general solution to provide protection against buffer-overflow and other memory-manipulation attacks. This solution uses cryptography as a first-class operation. Specifically, pointers (addresses) to be used by the program counter of a computer's central processing unit (CPU) are secured by encryption. Program-counter encryption defeats common forms of subversion of a process from within its own security perimeter.

The program counter is secured by encrypting addresses as they are stored in memory, and decrypting those addresses as they are loaded into the CPU program counter. Even if an attacker were able to insert malicious code and overwrite an encrypted pointer, it would be nearly impossible for the attacker to compute the correct program counter value to cause the CPU to execute the malicious code. At worst, a buffer overflow could cause a daemon process to crash. This would typically create a denial of service for the attacked computer, but this is significantly more desirable than allowing the attacked computer to be compromised.

Advances in cryptographic algorithms and implementation techniques have enabled the use of cryptography as a means for protecting-memory on this large scale. The preferred embodiment of the present invention employs a type of cryptography defined by the Advanced Encryption Standard (AES) algorithm from the National Institute of Standards and Technology. The AES algorithm offers substantially higher performance, simpler implementation, and higher security than previous algorithms. In addition, the AES algorithm may be performed quickly. The AES algorithm has been successfully applied to Internet protocol security devices in networks operating at 10 Gb/s rates. This is comparable to a typical 64-bit memory bus operating at 133 MHz. In addition, encryption latencies of around 20-30 ns for single 128-bit AES encryption operations are achievable in current application-specific integrated-circuit technology. Such latencies are comparable to the execution time of 10 instructions on high-end processors, and are substantially less than the access times of typical DRAM memories. This jump in cryptographic performance suggests that AES encryption and decryption can be used as first-class operations, and exploited in workstation hardware and software architectures.

Having an appropriately fast implementation is desirable for the present invention, but the answer is not as simple as inserting the AES algorithm into an operating system kernel and memory bus. To secure the program counter, substantially all of the places where pointers are used from the data space are identified, and consistently encrypted and decrypted properly. These include pointers to functions, return addresses, dynamically linked libraries, etc. Substantially all of the places code is generated to use and store these pointers are also identified, and a compiler is desirably modified to encrypt and decrypt the pointers during compilation. The major results of this task are kernel, compiler, linker, and loader modifications that substantially thwart buffer overflow attacks by inhibiting the ability of an attacker to successfully overwrite pointers.

In the following discussion, processes and subprocesses within a computer program serve to take an active role to inhibit attacks upon the computer during initialization and execution of other processes, which other processes are the normal (i.e., non-attack-inhibiting) processes of the computer, including but not limited to, the operating system and application programs of the computer. To avoid confusion, all processes and subprocesses involved in attack-inhibition are hereinafter referred to as "procedures."

Figure 2:
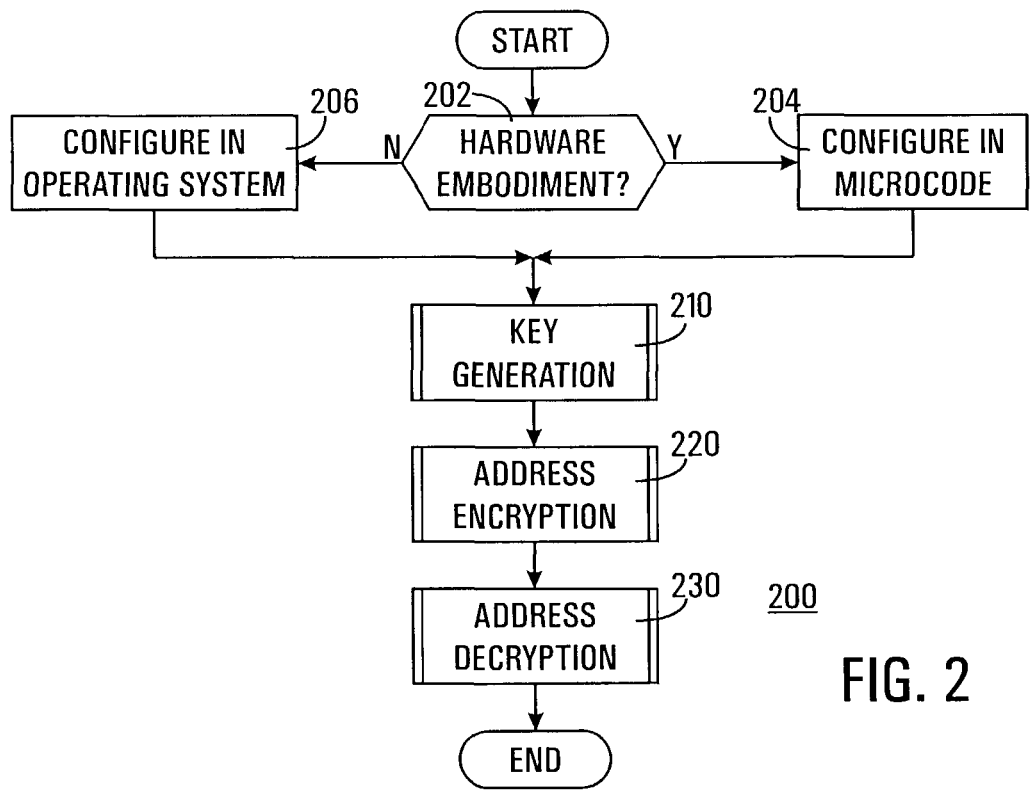
FIG. 2 shows a flowchart depicting an attack-inhibiting procedure effected by the computer program of FIG. 1 in accordance with preferred embodiments of the present invention.
Figure 3:
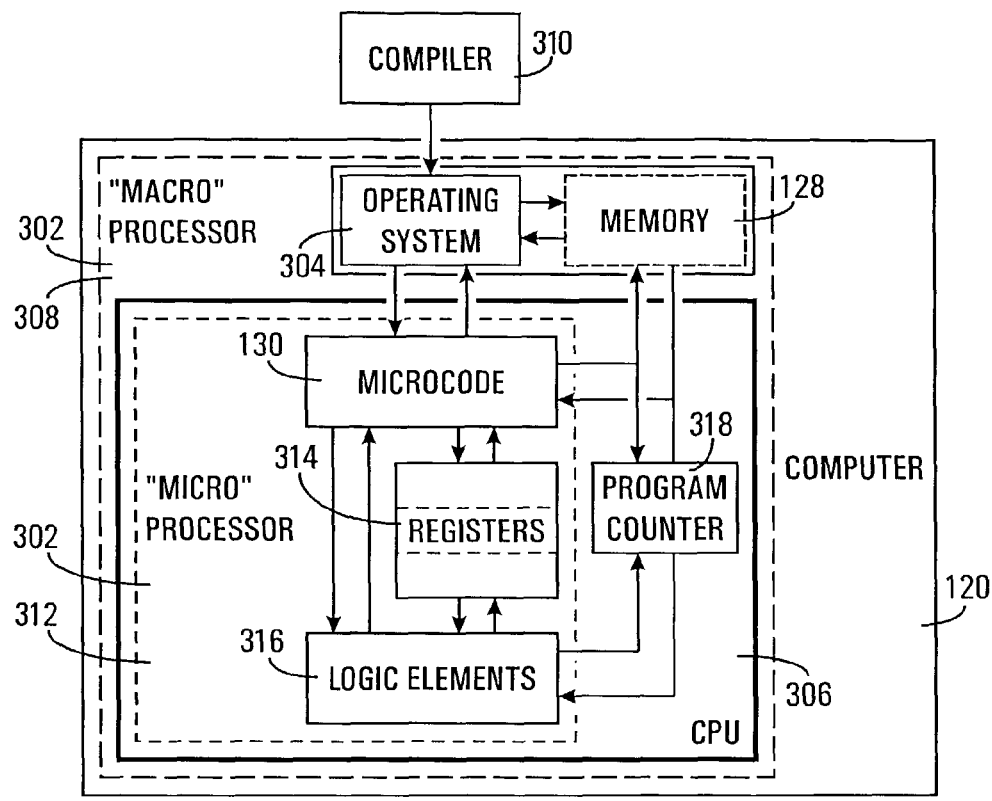
FIG. 3 shows a schematic view depicting processors configured to run the computer program of FIG. 1 to execute the procedure of FIG. 2 in accordance with preferred embodiments of the present invention.

In accordance with preferred embodiments of the present invention, FIG. 1 shows a schematic view depicting the relationship between an attack-inhibiting computer program 100 and a computer 120. FIG. 2 shows a flowchart depicting an attack-inhibiting procedure 200, where procedure 200 is a process effected by computer program 100. FIG. 3 shows a schematic view depicting processors 302 configured to run program 100 to execute procedure 200.

Program 100 is configured to run on computer 120 and execute attack-inhibiting procedure 200. As demonstrated in FIG. 1, however, program 100 itself resides upon a computer readable medium 122. Medium 122 may be a transport medium 124, a system medium 126, a system memory 128, CPU microcode 130, or hardware logic.

For purposes of this discussion, transport medium 124 is assumed to be a medium 122 (such as an optical or magnetic disc) external to computer 120, used to transport program 100, and/or from which program 100 may be copied or loaded into computer 120. Similarly, system medium 126 is assumed to be a medium 122 (such as a hard drive) within computer 120.

While residing upon either transport medium 124 or system medium 126, program 100 is dormant, i.e., inoperative. Typically, program 100 is moved from transport medium 124 or system medium 126 to system memory 128. Once in memory 128, program 100 may be executed to effect attack-inhibiting procedure 200.

The use of transport medium 124, system medium 126, and memory 128 to contain program 100 is typical of a "software" embodiment of the present invention. In this case, program 100 is incorporated into an operating system 304 of computer 120.

Alternatively, program 100 may be incorporated into CPU microcode 130 within a CPU (central processing unit) 306 of computer 120, or may be implemented directly in hardware logic as a "state machine" in CPU 306. Discussions of microcode 130 hereinafter are assumed to pertain also to state machines.

By being within CPU 306, program 100 operates invisibly with regard to operating system 304 and any other programs (not shown) executing on computer 120. Since microcode 130 is a component of CPU 306, the use of microcode 130 to contain program 100, is typical of a "hardware" embodiment of the present invention. Such a hardware embodiment is inherently faster and therefore preferred over a software embodiment. The hardware embodiment is also preferred because operating system 304 and other software may be changed at will without loss of attack inhibition.

Computer program 100 together with certain elements of hardware together form a "processor" 302 as depicted in FIG. 3. It will be appreciated that the terms "processor," "'macro' processor," and "'micro' processor," as discussed herein, are limited to the definitions described herein, and that no other definitions are intended or implied.

When the present invention is realized in a software embodiment, as discussed hereinbefore, processor 302 is a "macro" processor 308 formed of operating system 304, CPU 306, and memory 128. Operating system 304 contains program 100. CPU 306 reads and carries out the instructions of operating system 128. Memory 128 is associated with operating system 304 and CPU 306 and contains pointers (addresses) to be encrypted and decrypted, and may also contain keys and other protected data (discussed hereinafter). It is understood that operating system 304 itself resides in memory 128. An additional component of "macro" processor 308 is compiler 310 used to compile operating system 304.

Conversely, when the present invention is realized in a hardware embodiment, as discussed hereinbefore, processor 302 is a "micro" processor 312 formed of CPU 306 and memory 128. Within CPU 306 there exists microcode 130, registers 314, and logic elements 316. Microcode 130 contains program 100. Logic elements 316 read and carry out the instructions of microcode 130. Memory 128 is associated with operating system 304 and microcode 130 and contains pointers (addresses) to be encrypted and decrypted. Registers 314 contain keys and other protected data (discussed hereinafter). While not explicitly depicted in FIG. 3, compiler 310 may be used to compile microcode 304.

It may also be desirable to realize a software embodiment of the present invention in which operating system 128 contains program 100, memory 128 contains pointers (addresses) to be encrypted and decrypted, and registers 314 contain keys and other protected data (discussed hereinafter).

Those skilled in the art will appreciate that the software and hardware embodiments discussed hereinbefore are exemplary only, and that other embodiments are realizable. For example, a composite embodiment may be realized in which a hardware embodiment uses one encryption/decryption algorithm and a software embodiment uses another encryption/decryption algorithm. By proper selection of the algorithms, a system may be realized which has a lower level general protection at high speed (the hardware embodiment) and a higher level specific protection at a slower speed (the software embodiment). The use of these and other embodiments does not depart from the spirit of the present invention.

Those skilled in the art will also appreciate that program 100 remains configured to inhibit buffer-overflow and other pointer-overwrite attacks whether program 100 is dormant or active. Throughout the remainder of this discussion, program 100 is assumed to be active.

Referring to FIGS. 1, 2, and 3, a phantom configuration decision 202 is made to distinguish between hardware and software embodiments of the present invention. If a hardware embodiment, then in a task 204 computer program 100 is incorporated into CPU microcode 130 and attack-inhibiting procedure 200 is executed therefrom. Conversely, if a software embodiment, then in a task 206 computer program 100 is incorporated into operating system 304 in system memory 128 and procedure 200 is executed therefrom.

All sub-procedures and tasks in attack-inhibiting procedure 200 discussed hereinafter are presumed to be effected in either CPU microcode 130 or operating system 304 as determined by decision 202. To simplify this discussion, the present invention is presumed throughout the remainder of this discussion to be realized in a software embodiment with program 100 contained within operating system 304, residing within memory 128, and effecting attack-inhibiting procedure 200, except where specifically indicated otherwise.

As demonstrated in FIG. 1, computer program 100 contains a plurality of code portions 102. Each code portion 102 is configured to effect a specific task within attack-inhibiting procedure 200. This being the case, discussion of a given task will be assumed to be discussion of the specific code portion 102 within program 100 configured to effect that task. A reference number assigned to a given task therefore references both the task and its specific code portion.

Figure 5:
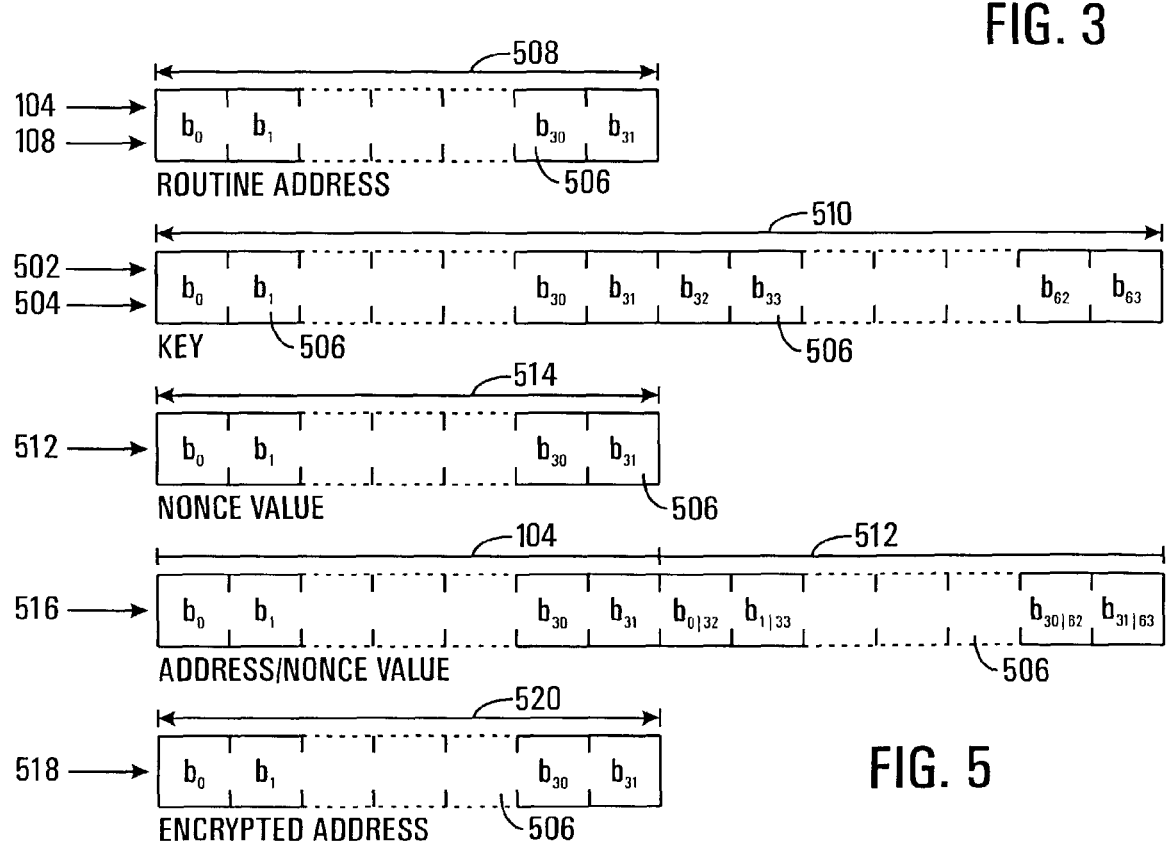
FIG. 5 shows a bit-width comparison between addresses and values used in the computer program of FIG. 1 in accordance with a preferred embodiment of the present invention.
Figure 4:
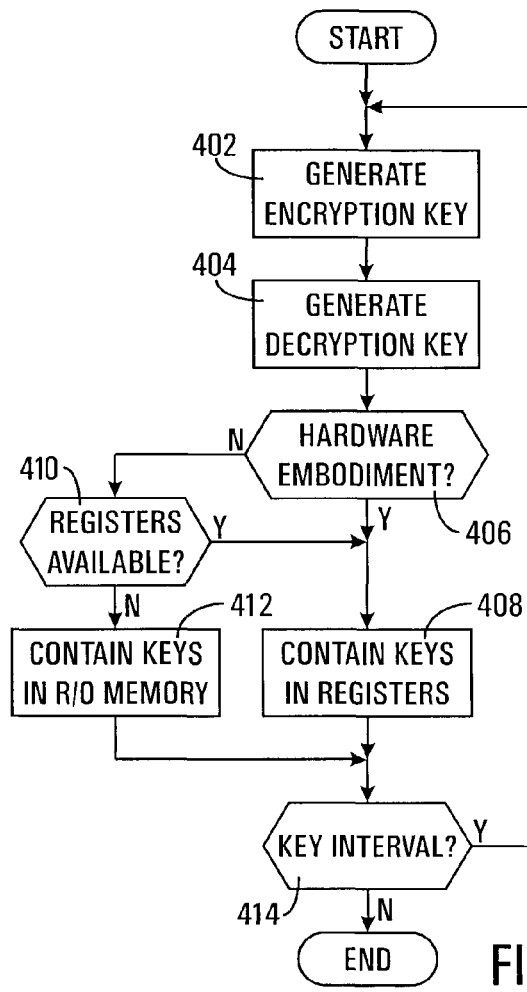
FIG. 4 shows a flowchart of a key-generation sub-procedure of the procedure of FIG. 2 in accordance with a preferred embodiment of the present invention.

FIG. 4 shows a flowchart of a key-generation procedure 210 as a sub-procedure of attack-inhibiting procedure 200, and FIG. 5 shows a bit-width comparison between addresses and values used in computer program 100 in accordance with a preferred embodiment of the present invention. The following discussion refers to FIGS. 2, 4, and 5.

Program 100 effects key-generation procedure 210 of attack-inhibiting procedure 200. Within key-generation procedure 210, a task 402 generates an encryption key 502 and a task 404 generates a decryption key 504. Keys 502 and 504 are used to encrypt and decrypt process addresses 104 as discussed hereinafter.

Those skilled in the art will appreciate that tasks 402 and 404 may be combined into a single task 402 that generates a single key 502 for both encryption and decryption of process addresses 104. For the sake of simplicity, this discussion assumes the use of separate encryption and decryption keys 502 and 504. It should be understood, however, that the use of one key 502 for both encryption and decryption does not depart from the spirit of the present invention.

Keys 502 and 504 are desirably protected. If an attacker were to gain access to (i.e., read the value of) keys 502 and 504, then that attacker might be in a position to subvert the encryption and decryption methodology and implant and execute malicious code.

Once tasks 402 and 404 have generated keys 502 and 504, a phantom query task 406 distinguishes between hardware and software embodiments of the present invention. If the present invention is embodied in hardware, then a task 408 contains (i.e., stores) keys 502 and 504 in registers 314 within CPU 306. Since this is a hardware embodiment, which requires configuration of CPU 306 during manufacture, these registers 314 may be dedicated "key registers." This allows keys 502 and 504 to be contained without sacrificing functionality and performance of CPU 306.

If the present invention is embodied in software, then a query task 410 determines if registers 314 are available for keys 502 and 504. If task 410 determines that registers 314 are available, then task 408 contains keys 502 and 504 in those registers 314. Since this is a software embodiment, these registers 314 are typically not dedicated "key registers" and are usurped for this purpose. This means that CPU 306 may lose these registers 314, with a possible subsequent decrease in functionality and performance.

If task 410 determines that registers 314 are not available, then a task 412 contains keys 502 and 504 in memory 128. Since it is desirable that keys 502 and 504 be protected, keys 502 and 504 are typically stored in read-only memory. For example, in Unix and Unix-like systems, keys 502 and 504 would be stored in either the text or rodata segment, rather than in either the data or bss segment.

Tasks 406 and 410 may be implicit tasks. That is, tasks 406 and 410 may reside within decision 202 and not be explicitly implemented. In such a case only the desired one of tasks 408 and 412 need be incorporated within attack-inhibiting procedure 200.

Keys 502 and 504 are desirably generated during operating system initialization and as a part of the initialization of each process (program) executed on computer 120. It is often desirable to generate keys 502 and 504 anew at intervals during operation of computer 120. Such repeated generation of keys 502 and 504 significantly increases the level of security of the system. The interval may be periodic or irregular, as desired, with a random and more frequent key interval offering the greatest increase in security.

When repeated generation is desired, an optional query task 414 is used to determine when the interval (not shown) has passed. When the interval has passed, procedure 210 is repeated and keys 502 and 504 are again generated and contained. Task 414 remains active in the background to cause generation after each interval.

Keys 502 and 504 are desirably generated using random-seed techniques well known in the art. This results in different keys 502 and 504 after each generation. Those skilled in-the art will appreciate that data encryption must therefore take place after each generation of keys 502 and 504 to avoid decryption failure.

Referring to FIG. 5, process addresses 104 (i.e., addresses of and/or associated with a process or operation within operating system 304) have a predetermined number of bits 506, i.e., have a predetermined bit length 508. Bit length 508 is a property of CPU 306 and memory 128. As depicted, bit length 508 is thirty-two bits 506. It will be appreciated, however, that this is purely exemplary. Other bit lengths 508 may be used for process addresses 104 without departing from the spirit of the present invention.

Desirably, keys 502 and 504 have at least as many bits 506 as process address 104, i.e., have a bit length 510 at least as great as process-address bit length 508. More desirably, keys 502 and 504 have a bit length 510 of at least sixty-four bits 506. This provides keys 502 and 504 that have a very low probability of determination. That is, an attack would find it nearly impossible to guess the values of keys 502 and 504.

Figure 6:
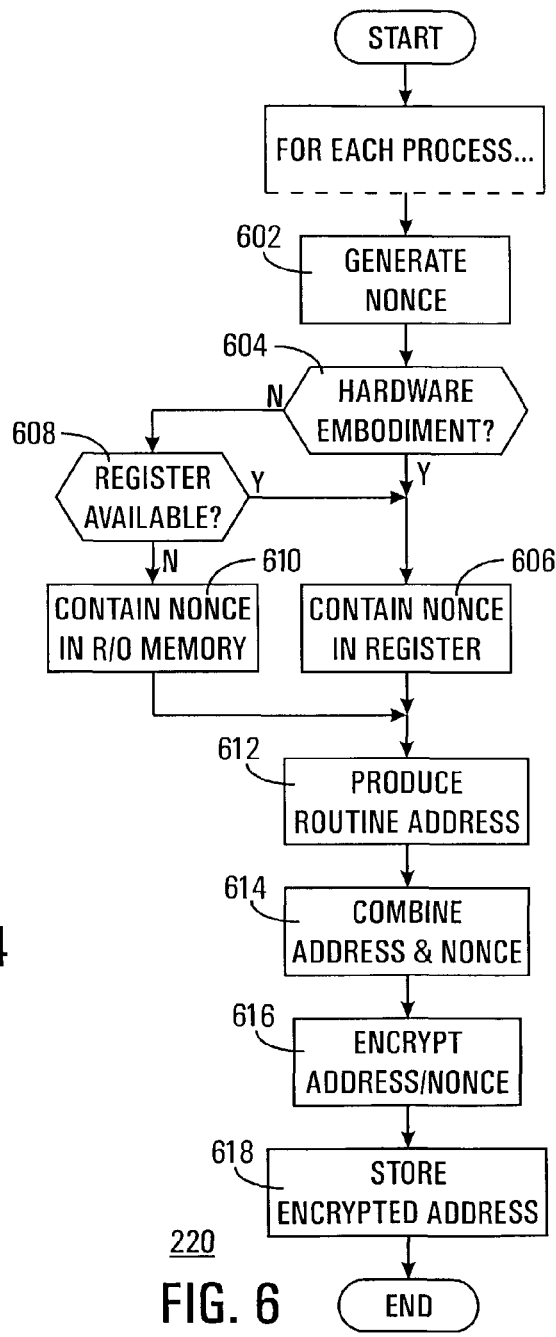
FIG. 6 shows a flowchart of an address-encryption sub-procedure of the procedure of FIG. 2 in accordance with a preferred embodiment of the present invention.

FIG. 6 shows a flowchart of an address-encryption procedure 220 as a sub-procedure of attack-inhibiting procedure 200 in accordance with a preferred embodiment of the present invention. The following discussion refers to FIGS. 2, 5, and 6.

Following key generation, program 100 effects address-encryption procedure 220 of attack-inhibiting procedure 200. In conventional (i.e., non-encrypted) systems, process address 104 is produced and placed into data memory 128, e.g., a return address is determined and PUSHed onto the stack. In procedure 220, process address 104 is encrypted before being placed into data memory 128.

As depicted in FIG. 6, procedure 220 is effected for each process (not shown) in operating system 304 containing a process address 104 stored in read/write memory 128. Since in many operating systems 304, virtually all processes are CALLed, i.e., accessed though a CALL function. CALLed processes have a return address PUSHed onto the stack, i.e., written to writeable memory 128. The return address of each CALLed process is therefore an exposed process address 104 and should be encrypted. This encryption should desirably take place interactively, i.e., when the process is CALLed. Also, the CALL address of a process, i.e., the actual address 104 of a process where it resides in memory 128, is often located in read-only portions of memory 128. This address 104 is still vulnerable to inspection and capture, and should be encrypted. This encryption should desirably take place during system initialization and each type encryption key 502 is updated. Therefore, it is desirable that all process addresses 104 in operating system 304 be encrypted.

Within address-encryption procedure 220, an optional task 602 generates a nonce value 512. Nonce value 512 is an arbitrary and random value used to deepen the encryption of a process address 104 as discussed hereinafter.

Since nonce value 512 is a part of the encryption process, nonce value 512 is desirably protected. If an attacker were to gain access to nonce value 512, then that attacker would be more able to subvert the encryption and decryption methodology and implant and execute malicious code.

Once task 602 has generated nonce value 512, a phantom query task 604 distinguishes between hardware and software embodiments of present invention. If the present invention is embodied in hardware, then a task 606 contains (i.e., stores) nonce value 512 in a register 314 within CPU 306. Since this is a hardware embodiment, which requires modification of CPU 306 during manufacture, each of these registers 314 may be a dedicated "nonce register." This allows each nonce value 512 to be contained without sacrificing functionality and performance of CPU 306.

If the present invention is embodied in software, then a query task 608 determines if a register 314 is available for nonce value 512. If task 608 determines that a register 314 is available, then task 606 contains nonce value 512 in that register 314. Since this is a software embodiment, these registers 314 are typically not dedicated "nonce registers" and are usurped for this purpose.

If task 608 determines that a register 314 is not available, then a task 610 contains nonce value 512 in memory 128. Since it is desirable that nonce value 512 be protected, nonce value 512 is typically stored in read-only memory.

Tasks 604 and 608 may be implicit tasks. That is, tasks 604 and 608 may reside within decision 202 and not be explicitly implemented. In such a case only the desired one of tasks 606 and 610 need be incorporated within attack-inhibiting procedure 200.

Desirably, a different nonce value 512 is used for each process in operating system 304. Operating system 304 may contain hundreds or even thousands of processes. This may make it impossible to obtain sufficient registers 314. Under these circumstances, tasks 608 and 606 are not feasible and are omitted, and task 610 contains nonce value 512 in memory 128 if a software embodiment is effected.

Desirably, nonce values 512 are generated for each process when started by the operating system. In some implementations, this may not be possible. Under these conditions, it may be necessary to generate fewer nonce values 512 than there are processes. That is, processes may be made to share nonce values 512.

In an alternative embodiment, it may be desirable to generate keys 502 and 504 in response to a nonce value 512. Those skilled in the art will appreciate that this may be accomplished by migrating tasks 602, 604, 606, 608, and 610 into procedure 210. The use of this or other alternative embodiments does not depart from the spirit of the present invention.

While not specifically depicted in FIG. 6, those skilled in the art will appreciate that it may be desirable in some embodiments to generate nonce values 512 anew at intervals during operation of computer 120. Such repeated generation of nonce values 512 may increase the level of security of the system. The interval may be periodic or irregular, as desired, with a random key interval offering the greatest increase in security.

When repeated generation of nonce values 512 is desired, it may be accomplished in a manner analogous to the repeated generation of keys 502 and 504 discussed hereinbefore.

Nonce values 512 are desirably generated using random-seed techniques well known in the art. This results in different values for each nonce value 512 generated.

Referring to FIG. 5, nonce values 512 desirably have a bit length 514 of at least twenty-four bits, and more desirably have a bit length 514 equal to process-address bit length 508. This provides nonce values 512 that have a very low probability of determination. That is, an attack would find it nearly impossible to determine the values of nonce values 512.

Those skilled in the art will appreciate that the use of nonce values 512 is optional. When it is desired to forego the use of nonce values 512, tasks 602, 604, 606, 608, and 610 are omitted.

Procedure 220 then executes a task 612 to produce process address 104. Task 612 effectively "captures" or intercepts process address 104 generated or retrieved by operating system 304.

As discussed hereinbefore, process address 104 is a pointer stored in memory 128 which is to be loaded into a program counter 318 within CPU 306. Process address 104, therefore, may be an address in a read-only segment of memory 128 where a process resides (i.e., a constant-function pointer), an address in a read/write segment of memory 128 (e.g., in the stack) to which control will jump or return upon completion of a process (i.e., a call-and-return pointer), an address in a table to which control will be transferred (i.e., a transfer pointer), or an address which points to another address (i.e., a secondary pointer).

When nonce values 512 are used, a task 614 then combines process address 314 with an appropriate nonce value 512 to produce an address/nonce value 516. Task 614 may combine process address 104 and nonce value 512 in any of numerous ways well known to those skilled in the art. Each of these ways has advantages and disadvantages and may be used without departing from the spirit of the present invention. Typical of such ways are adding, XORing, and concatenating. For address/nonce value 516, task 614 has concatenated process address 104 and nonce value 512.

A task 616 then encrypts address/nonce value 516 (if nonce values 512 are used) or process address 104 (if nonce values 512 are not used) in response to encryption key 502 to produce an encrypted address 518.

Desirably, task 616 performs this encryption using the Advanced Encryption Standard algorithm from the National Institute of Standards and Technology. Those skilled in the art will appreciate, however, that this is not a requirement of the present invention, and that other encryption algorithms may be used without departing from the spirit of the present invention. For example, the encryption process may include the storage address in memory 128 as a part of the data encrypted or of the key value used. This or any of numerous other methods of inputting the storage address into the encryption process may be used.

Task 616 for a given process is performed each time an encryption key 502 for that process is generated, i.e., during process startup or system initialization and after each key interval. In some alternative embodiments, it may be desirable to link the key interval to process usage. In such an embodiment, a new encryption key 502 may be generated and task 616 executed each time the process is used.

Desirably, a task 618 then stores encrypted address 518 in memory 128 in lieu of process address 104. Since encrypted address 518 is to be stored in memory 128 in lieu of process address 104, it is desirable that encrypted address 518 has a bit length 520 that is substantially the same as process-address bit length 508. This allows encrypted address 518 to dovetail into operating system 304 and other areas of memory 128 without further modification.

Following task 618, address-encryption procedure 220 ends, and program control then proceeds within operating system 304.

FIG. 7 shows a flowchart of an address-decryption procedure 230 as a subprocess of attack-inhibition procedure 200 in accordance with a preferred embodiment of the present invention. The following discussion refers to FIGS. 2, 5, and 7.

Program 100 then effects address-decryption procedure 230 as a sub-procedure of attack-inhibiting procedure 200. In conventional (i.e., non-encrypted) systems, process address 104 is retrieved from memory 128 and placed into program counter 318, e.g., a return address is POPed from the stack and loaded into program counter 318. In procedure 230, process address 104 is decrypted before being placed into program counter 318.

Within address-decryption procedure 230, a task 702 retrieves encrypted address 518 from memory 128. A task 704 then decrypts encrypted address 518 in response to decryption key 504 (for a dual-key embodiment) or key 502 (for a single-key embodiment). The method used by task 704 to decrypt encrypted address 518 is the compliment of the method used by task 616 (discussed hereinbefore) to produce encrypted address 518. If nonce values 512 are not used, task 704 reproduces process address 104.

If nonce values 512 are used, task 704 reproduces address/nonce value 516. A task 706 then extracts process address 104 and nonce value 512 from address/nonce value 516. The method used by task 706 to extract process address 104 and nonce value 512 is dependent upon the method used by task 614 (discussed hereinbefore) to produce address/nonce value 516. For address/nonce value 516, task 614 has concatenated process address 104 and nonce value 512. Therefore, task 706 divides address/nonce value 516 to reproduce process address 104 and nonce value 512.

Following task 706 (if nonce values 512 are used) or task 704 (if nonce values 512 are not used), a task 708 may be used to determine if process address 104 is valid. In most modern operating systems 304, a large part of CPU 306 address space will be empty. Therefore, only a fraction of randomly chosen values for program counter 318 will be legitimate process addresses 104, i.e., will point to a valid area within memory 128. Operating system 304 itself is typically configured so that an illegitimate process address 104 will cause an immediate fault. Also, for some CPUs 306, values for program counter 318 must have specific alignments, e.g., sixteen or thirty-two bit boundaries. CPU 306 may cause an immediately fault if the value of program counter 318 is not properly aligned. Task 708 desirably checks process address 104 these and other address features which may signal address invalidity.

A fault caused by an illegitimate value in program counter 318 may itself be unpredictable. That is, there may be no practical way of determining where operation will go and what will occur when it gets there. Task 708 eliminates this problem by determining if process address 104 is valid before process address 104 is placed into program counter 318. Task 708 may accomplish this by comparing process address 104 against acceptable values for program counter 318.

Those skilled in the art will appreciate that task 708 is optional. If task 708 is not used, then an illegal value for process address 104 may result in an uncontrolled system crash unless nonce value 512 is used and verified. Nevertheless, a system crash is deemed preferable to the execution of malicious code.

If nonce value 512 is used, and if task 708 is not used or is used and determines that process address 104 is valid, a task 710 may be used to determine if nonce value 512 is valid. If an attack has occurred corrupting a given encrypted address 518, then nonce value 512 extracted from that corrupted encrypted address 518 will not match the original nonce value 512 generated by task 602 (discussed hereinbefore). Task 710 determines if nonce value 512 is valid before process address 104 is placed into program counter 318.

If task 708 determines that process address 104 is valid and task 710 is not used, or task 708 is not used and task 710 determines that nonce value 512 is valid, or task 708 determines that process address 104 is valid and task 710 determines that nonce value 512 is valid, then a task 712 places process address 104 in program counter 318 and control is transferred to a valid process 106 whose starting location in memory 128 is process address 104, as indicated at a task 714.

Conversely, if either task 708 determines that process address 104 is invalid or task 710 determines that nonce value 512 is invalid, then a task 716 places a crash address 108 in program counter 318 and control is transferred to a crash and terminate process 110 as indicated at a task 718. Crash and terminate process 110 is a process that allows a "controlled crash" of computer 120 or the affected process. That is, crash and terminate process 110 desirably performs safe shutdown procedures, displays a message notifying an operator of the system crash, and terminates the operation of computer 120. This action is based upon the assumption that it is better to terminate operation than to allow the system to be compromised.

Those skilled in the art will appreciate that task 616 and crash and terminate process 110 are not requirements of the present invention and may be omitted without departing from the spirit of the present invention.

Those skilled in the art will also appreciate that other corrective actions may be taken in lieu of task 616 and crash and terminate process 110 without departing from the spirit of the present invention. For example, in a Unix process, the damaged process might receive a signal and execute a "longjmp( )" call to return to the main loop of the program and possibly re-initialize the process. Such "exception-handling" processes are well known in the art.

By encrypting process addresses 104 that are stored in writeable segments of memory 128, or, more desirably, all process addresses 104, the present invention inhibits buffer-overflow and memory-manipulation attacks. If all process addresses 104 are encrypted while stored in writeable memory 128, an attacker may still be able to gain access to and successfully modify a given process address 104. However the attacker will be unable to predict where the modified address will actually point after decryption.

Thus, if process addresses 104 are encrypted, the most probable effect of a successful buffer overflow attack would be to cause an immediate fatal error in the corrupted process, rather than execute the attacker's code. Desirably, the attack will result in execution of crash and terminate process 110 and results in a denial of service to computer 120. The attack does not result in an undetected compromise of the attacked system. This is a major improvement over prior-art techniques.

As discussed hereinbefore, encryption and decryption procedures 220 and 230 would ideally reside in microcode 130 within CPU 306 itself, or directly in hardware logic in a state machine (e.g., a RISC-type CPU). This would allow decryption procedure 230 to be performed automatically as part of the microcode instruction loading program counter 318. In this "hardware" embodiment, the encryption and decryption keys 502 and 504 may be held in processor registers 314, inaccessible to the actual processes (i.e., the operating system and other higher-level programs).

The present invention therefore implements an alternative encrypted process address 104 strategy using a "software" embodiment. In this alternative strategy a compiler 310 is modified to produce an operating system 304 containing the elements of computer program 100.

FIG. 8 shows a flowchart of a compilation procedure 800 for creation of attack-inhibiting procedure 200 in accordance with a preferred embodiment of the present invention. The following discussion refers to FIG. 8.

Through compilation procedure 800, compiler 310 compiles computer program 100 to include code to perform encryption and decryption of process addresses 104 that may be loaded into program counter 318.

It may be desirable to extend the bit length of function pointers (i.e., of process addresses 104) to reduce the probability that a random address value from an attacker might succeed (e.g., in a "birthday" attack). Within procedure 800, a query task 802 determines if the bit length 508 of process addresses 104 is to be extended. If task 802 determines that bit length 508 is to be extended, then a task 804 compiles code to extend bit length 508 of each process address 104 in program 100.

Those skilled in the art will appreciate that tasks 802 and 804 are optional, i.e., are not a requirement of the present invention. The omission of tasks 802 and 804 does not depart from the spirit of the present invention.

Additionally, those skilled in the art will appreciate that, when task 804 is used, task 802 may be implicit. The use of an implicit task 802 does not depart from the spirit of the present invention.

A task 806 then compiles code to incorporate per-process nonce values 512 into each process address 104. These nonce values 512 may be checked after decryption as an additional defense and attack-detection mechanism as discussed hereinbefore in connection with tasks 710, 716, and 718.

Those skilled in the art will appreciate that task 806 is also optional, and that omission of task 806 does not depart from the spirit of the present invention.

As discussed hereinbefore, process address 104 is a pointer stored in memory 128, which is to be loaded into a program counter 318 within CPU 306. Process address 104, therefore, may be a constant-function pointer 104 (i.e., an address in a read-only segment of memory 128 where a process resides), a call-and-return pointer 104 (i.e., an address in a read/write segment of memory 128 (e.g., in the stack) to which control will jump or return upon completion of a process), a transfer pointer 104 (i.e., an address in a table to which control will be transferred), or a secondary pointer 104 (i.e., an address which points to another address). Each of these pointer types is handled separately.

A task 808 compiles code to encrypt and decrypt constant-function pointers 104, a task 810 compiles code to encrypt and decrypt call-and-return pointers 104, a task 812 compiles code to encrypt and decrypt transfer pointers 104, and a task 814 compiles code to encrypt and decrypt secondary pointers 104.

Those skilled in the art will appreciate that the code compiled by tasks 808, 810, 812, and 814 encrypt and decrypt process addresses 104 during initialization (boot) and operation of computer 120.

In summary, the present invention teaches a procedure 200 and program 100 for inhibiting attack upon a computer 120. Process addresses 104 are encrypted, stored, and decrypted prior to being placed in a program counter 318. The encryption and decryption of process addresses 104 may be effected within a CPU 306, may be effected through the use of secure keys 502 and 504, and may be effected in conjunction with a nonce value 512. Post-decryption verification of process addresses 104 is supported.

Although a preferred embodiment of the invention has been illustrated and described in detail, it will be readily apparent to those skilled in the art that various modifications may be made therein without departing from the spirit of the invention or from the scope of the appended claims.

What is claimed is:

1. A method comprising:
   securing a program counter of a computer by performing the following for each process to be executed by said computer:
      producing a process address for a process located in a memory of said computer, said process, address being associated With an address of an instruction to be executed by said computer and designed to be loaded in a program counter of said computer;
      generating a nonce value, wherein said nonce value is a random nonzero value;
      encrypting said process address in conjunction with said nonce value before storing said process address in a call stack of said computer, thereby producing an encrypted address;
      storing said encrypted address in said call stack of said computer;
      retrieving said encrypted address from said call stack of said computer;
      decrypting said encrypted address to reproduce said process address and said nonce value;
      determining whether said nonce value is valid; and
      placing said process address in said program counter of said computer when said nonce value is valid.

2. A method as claimed in claim 1 wherein said encrypting and decrypting activities are effected within an operating system of said computer.

3. A method a claimed in claim 1 additionally comprising generating a key for one of said encrypting and decrypting activities.

4. A method as claimed in claim 3 additionally comprising containing said key within a register of a central processing unit of said computer.

5. A method as claimed in claim 3 wherein;
said process address is expressed in a predetermined number of bits; and
said key contains at least as many bits as said process address.

6. A method as claimed in claim 3 wherein said key contains at least sixty-four bits.

7. A method as claimed in claim 3 wherein said generating activity generates said key during initialization of said computer.

8. A method as claimed in claim 3 wherein said generating activity generates said key during initialization of said process.

9. A method as claimed in claim 3 wherein said generating activity generates said key at intervals during operation of said computer.

10. A method as claimed in claim 1 wherein; said method additionally comprises:
generating an encryption key during initialization of said computer; and
generating a decryption key during initialization of said computer;
said encrypting activity encrypts said process address utilizing said encrypting key; and
said decrypting activity decrypts said encrypted address utilizing said decrypting key.

11. A method as claimed in claim 1 additionally comprising:
generating a key for one of said encrypting and decrypting activities in response to said nonce value.

12. A method as claimed in claim 1, additionally comprising placing a crash address in said program counter when said determining activity determines said nonce value is invalid.

13. A method as claimed in claim 1 wherein:
said encrypting activity comprises:
combining said process address and said nonce value to produce an address/nonce value; and
encrypting said address/nonce valve to produce said encrypted address; and said decrypting activity comprises:
decrypting said encrypted address to reproduce said address/nonce value; and
extracting said process address and Said nonce value from said address/nonce value.

14. A method as claimed in claim 1 wherein said encrypting activity encrypts said process address utilizing the Advanced Encryption Standard.

15. A method as claimed in claim 1 wherein:
said method additionally comprises determining, after said decrypting activity, if said process address is valid by determining whether said nonce value is valid; and
said placing activity places said process address in said program counter when said determining activity determines said process address it valid.

16. A method as claimed in claim 15 additionally comprising placing a crash address in said program counter when said determining activity determines said process address is invalid.

17. A method a claimed in claim 1 further comprising regenerating said nonce value at random time intervals during operation of said computer.

18. A method as claimed in claim 1, further comprising determining whether said nonce value is valid by determining whether said reproduced nonce value matches the generated nonce value.

19. A method as claimed in claim 1, further comprising:
generating a crash address when said nonce value is determined to be invalid, wherein said crash address executes a termination process for terminating the operation of said computer; and
placing said crash address in said program counter.

20. A computing device, comprising:
a memory containing a process; and
at least one of a processor and an operating system configured to secure a program counter of a computer by performing the following for each process to be executed:
produce a process address for said process, said process address being associated with an address of an instruction to be executed and formatted to be placed in a program counter;
produce a nonce value, wherein said nonce value is a random nonzero value,
encrypt said process address in conjunction with said notice value before storing said process address in a call stack, thereby producing an encrypted address,
store said encrypted address into said call stack,
retrieve said encrypted address from said call stack,
decrypt said encrypted address to reproduce said process address and said nonce value,
determine if said nonce value is valid, and
place said reproduced process address in said program counter when said notice value is valid.

21. A computing device as claimed in claim 20 additionally comprising a register configured to contain a key, and said process address is encrypted and decrypted based on said key.

22. A computing device as claimed in claim 21 wherein:
said process address contains a predetermined number of bits; and
said key contains at least as many bits as said process address.

23. A computing device as claimed in claim 21, wherein at least one of said processor and said operating system is further configured to:
regenerate said nonce value at random time intervals during operation of said computer;
determine whether each of said intervals has passed; and
generate another said nonce value when each of said intervals has passed.

24. A computing device its claimed in claim 23, wherein said key is generated at a plurality of intervals during operation of said computer and said key is generated at different intervals than said nonce value.

25. A computing device as claimed in claim 20 additionally comprising:
a first register configured to contain a first key, wherein said process address is encrypted based on said first key; and
a second register configured to contain a second key, wherein said encrypted address is decrypted based on said second key.

26. A computing device as claimed in claim 20 wherein at least one of said processor and said operating system is further configured to:
produce an address/nonce value from said process address and a nonce value;
encrypt said address/nonce value to produce said encrypted address;

decrypt said encrypted address to reproduce said address/nonce value; and reproduce said process address and said nonce value from said address/nonce value.

27. A computing device as claimed in claim 20 wherein at least one of said processor and said operating system is further configured to place a crash address into said program counter when said nonce value is invalid.

28. A computing device as claimed in claim 27, wherein said crash address is generated in response to said nonce value being invalid and wherein said crash address executes a termination process for terminating the operation of said computer.

29. An attack-inhibiting computer program residing upon a computer-readable non-transitory storage medium, wherein:
said attack-inhibiting computer program is configured to secure a program counter of a computer including a processor;
said attack-inhibiting computer program is configured to be incorporated into one of an operating system and a processor of said computer; and
said attack-inhibiting computer program comprises a plurality of code portions, each of which is configured to be performed for each process to be executed by said computer, said plurality of code portions including:
a first code portion configured to generate a nonce value and cause the processor to encrypt a process address in conjunction with said nonce value for a process contained in a memory of said computer before storing said process address in a call stack of said computer, thereby producing an encrypted address, wherein said process address is associated with an address of an instruction to be executed by said processor of said computer and designed to be placed in a program counter of said processor and wherein said notice value is a random nonzero value;
a second code portion configured to cause the processor to store said encrypted address in said call stack;
a third code portion configured to cause the processor to retrieve said encrypted address from said call stack;
a fourth code portion configured to cause the processor to decrypt said encrypted address to reproduce said process address and said nonce value;
a fifth code portion configured to determine if said nonce value is valid; and
a sixth code portion configured to cause the processor to place said process address in said program counter of said computer when said nonce value is valid.

30. An attack-inhibiting computer program as claimed in claim 29 wherein said computer program additionally comprises a seventh code portion configured to cause the processor to place a crash address into said program counter when said nonce value is invalid.

31. An attack-inhibiting computer program as claimed in claim 29 additionally comprising a seventh code portion configured to cause the processor to generate a key, wherein one of said first code portion is configured to encrypt said process address and said fourth code portion is configured to decrypt said encrypted address in response to said key.

32. An attack-inhibiting computer program residing upon a computer-readable non-transitory storage medium comprising:
a plurality of code potions incorporated into an operating system of a computer, each of which is configured to be performed for each process to be executed by said computer, said plurality of code portions being configured to cause the processor to secure a program counter of said computer; and including
a first one of said plurality of code portions which generates a nonce value and produces a process address for a process contained in a memory of said computer, said process address being associated with an address of an instruction to be executed by a processor of said computer and designed to be placed in a program counter of said processor and wherein said nonce value is a random nonzero value;
a second one of said plurality of code portions which encrypts said process address by combining said process address and said notice value to produce an encrypted address before storing said process address in a call stack of said computer, thereby producing an encrypted address;
a third one of said plurality of code portions which stores said encrypted address in said call stack;
a fourth one of said plurality of code portions which retrieves said encrypted address from said call stack;
a fifth one of said plurality of code portions which decrypts said encrypted address to reproduce said process address and said nonce value;
a sixth code portion configured to determine if said nonce value is valid; and
a seventh one of said plurality of code portions which places said process address in said program counter of said computer when said nonce value is valid.

33. An attack-inhibiting computer program as claimed in claim 32 wherein:
said computer program additionally comprises an eighth one of said plurality of code portions which determines if said process address decrypted by said fifth code portion is valid by determining whether said nonce value is valid; and
said seventh one of said plurality of code portions places said process address in said program counter when said seventh one of said plurality of code portions determines that said process address is valid.

34. An attack-inhibiting computer program as claimed in claim 32 additionally comprising an eighth one of said plurality of code portions which places a crash address in said program counter when said sixth one of said plurality of code portions determines that said nonce value is invalid.

35. An attack-inhibiting computer program as claimed in claim 32 additionally comprising an eighth one of said plurality of code portions which places a crash address in said program counter when said nonce value is invalid.

36. An attack-inhibiting computer program as claimed in claim 32 additionally comprising an eighth one of said plurality of code portions which generates a key.

37. An attack-inhibiting computer program as claimed in claim 36 wherein said second one of said plurality of code portions encrypts said process address in response to said key.

38. attack-inhibiting computer program as claimed in claim 36 wherein said fifth one of said plurality of code portions decrypts said encrypted address in response to said key.

39. A method comprising:
compiling code to encrypt and decrypt constant-pointers during initialization of a computer;
compiling code to encrypt and decrypt call-and-return pointers during initialization of said computer; and
securing as program counter of a computer by performing the following for each process to be executed by said computer:

retrieving data from a call stack, wherein said data is one of an encrypted pointer and an unencrypted pointer, wherein said encrypted pointer includes a nonce value processor and wherein said nonce value is as random nonzero value;

decrypting said data to reproduce said unencrypted pointer and said nonce value;

determining whether said decrypted data is a valid pointer by verifying that said nonce value is valid; and placing said pointer in said program counter of said computer when said nonce value is valid, wherein said pointer is associated with an address of an instruction to be executed by said computer.

40. A method as claimed in claim 39 additionally comprising:

determining a bit length of said constant-function pointers; and extending said bit length.

41. A method as claimed in claim 39 additionally comprising incorporating a per-process nonce value into said constant-function pointers.

42. A method as claimed in claim 39 additionally comprising compiling code to encrypt and decrypt secondary pointers of said computer program, wherein each of said secondary pointers points to one of said constant-function pointers.

43. A method as claimed in claim 39 additionally comprising compiling code to encrypt and decrypt transfer pointers during operation of said computer program.

44. A method as claimed in claim 39, further comprising:

generating a crash address in response to said nonce value being invalid; and placing said crash address in said program counter of said computer, wherein said crash address executes a termination process for terminating the operation of said computer.

\* \* \* \* \*